June 9, 1925. 1,540,927
A. W. CHARLES
VALVE
Filed Jan. 7, 1924 2 Sheets-Sheet 1
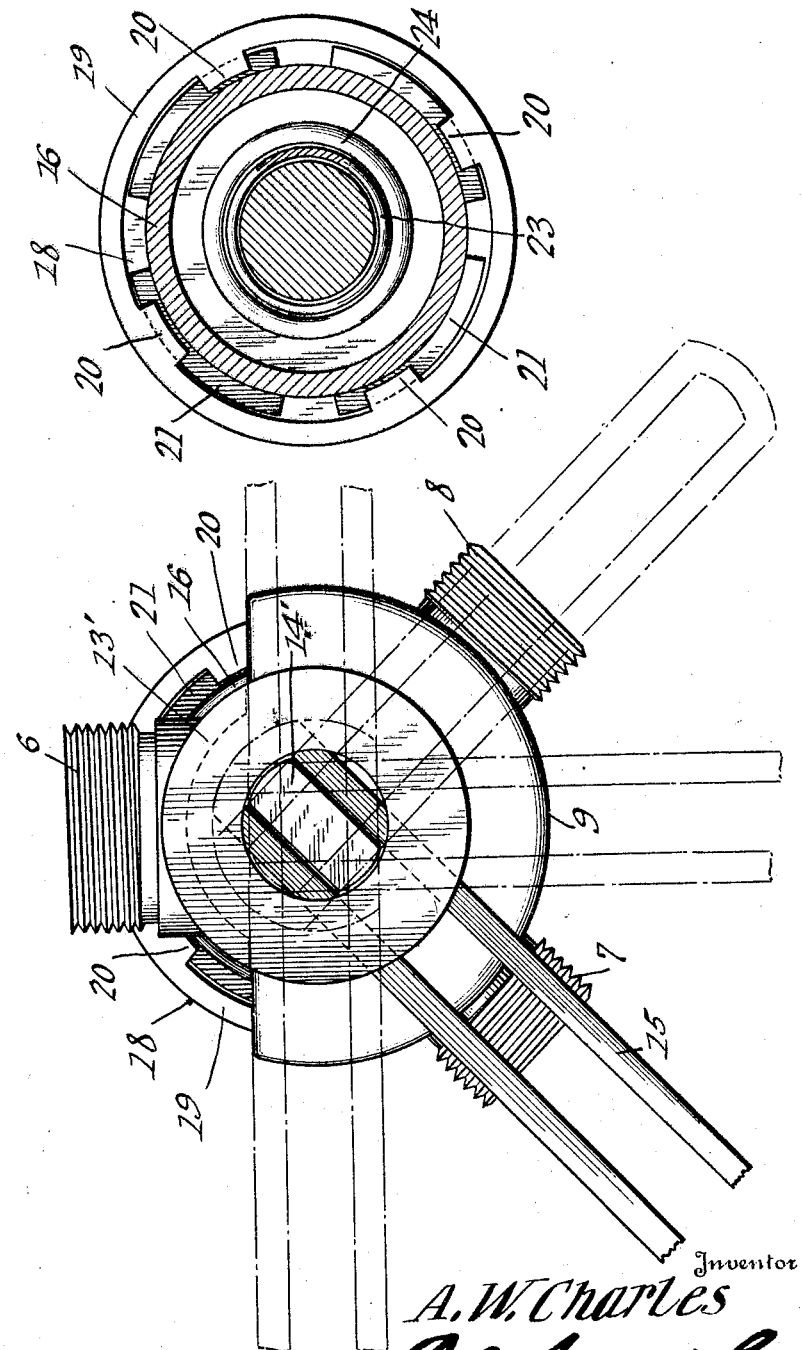
Inventor
A. W. Charles June 9, 1925.                                                    1,540,927
                          A. W. CHARLES
                              VALVE
                        Filed Jan. 7, 1924                2 Sheets-Sheet 2

Inventor
A. W. Charles
By C. A. Snow & Co.
Attorneys

Patented June 9, 1925.

1,540,927

UNITED STATES PATENT OFFICE.

ALFRED W. CHARLES, OF BUTTE, MONTANA.

VALVE.

Application filed January 7, 1924. Serial No. 684,837.

*To all whom it may concern:*

Be it known that I, ALFRED W. CHARLES, a citizen of the United States, residing at Butte, in the county of Silver Bow and State of Montana, have invented a new and useful Valve, of which the following is a specification.

This invention relates to valve constructions and more particularly to a valve construction of the three-way type.

The primary object of the invention is to provide a valve of this character wherein fluids and gases of various temperatures may be properly proportioned in their passage through the valve.

Another object of the invention is to provide novel means for controlling the movements of the valve to insure the valve being turned to its proper position.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawings:

Figure 1 is a plan view of a valve constructed in accordance with the invention.

Figure 2 is a transverse sectional view through the valve body, remote parts being omitted.

Figure 3 is a longitudinal sectional view through the valve body.

Figure 4 is a sectional view taken on line 4—4 of Figure 3.

Referring to the drawings in detail the reference character 5 designates the body of the valve which is formed with a pipe opening 6 and pipe openings 7 and 8 respectively.

The body 5 includes an outer wall 9 spaced from the inner wall 10 of the body, the wall 10 being formed with openings 11 that communicate with the pipes 7 and 8 respectively.

Operating within the valve body is a hollow plug 12 that is tapered to conform to the tapered opening in the valve body in which the same is positioned, the plug being provided with opposed openings 13 that are designed to communicate with the pipes 7 and 8 through the openings 11.

As shown, the plate 13' is formed integral with the valve body and extends over one end of the valve body, the same being disposed in spaced relation with the valve body as clearly shown by Figure 3 of the drawings. The valve plug 12 is formed with an extension 14', at one end over which the handle portion 15 is fitted. The handle 15 is relatively long and formed with a slot extending throughout substantially the entire length of the handle, the slot being designed to accommodate the extension 14', to permit the valve plug 12 to be rotated.

This handle 15 is curved so that adequate space will be provided between the handle and pipes not shown, and which have connection with the pipes 7 and 8 so that the operator's hand will not contact with such pipes when the valve is being turned.

Formed at the opposite end of the body 5 is an enlargement 16 through which the valve stem 17 extends, the valve stem 17 being relatively long as compared with the extension 14' and extends through the cap 18 removably supported on the extension 16, the cap being provided with an inwardly extended flange 19 formed with lugs 20. These lugs 20 cooperate with lugs 21 that are disposed in spaced relation with each other and extend outwardly from the extension 16 so that when the lugs 20 and 21 are moved into engagement with each other, the cap 18 is held in position. It will thus be seen that when the lugs 20 are moved between adjacent lugs 21, the cap may be removed from the valve body to remove the plug.

Overlying the cap 18 is a plate 22 which is disposed in spaced relation with the cap providing a clearance for the reception of the handle 15 should it be desired to remove the handle 15 and operate the plug from the end 17.

The plug 12 is held in position by means of the coiled spring 23 that is shown as positioned within the confines of the annular rib 24 of the cap 18 at one of its ends, the opposite end contacts with the plug 12 to exert a pressure on the plug to insure against the same leaking.

Thus it will be seen that if it is desired to remove the plug 12, the cap 18 is forced inwardly against the tension of coiled spring 23 and given a slight rotation in a clockwise direction to disengage the lugs 20 and 21. The handle 15 may now be removed and placed upon the opposite end of the valve or on the end 17 thereof. When the handle 15 is positioned on the end 17, the cap 22 is forced inwardly against the tension of coiled spring 23 and rotated slightly in an anti-clockwise direction until the lugs 20 and 21 are engaged as shown by Figure 3 of the drawing.

It might be further stated that portions of the edges of the plate 13' and plate 22 act as stops for the handle 15 to restrict movement of the handle and insure against the plug being rotated to a point wherein the openings 13 would be out of registry with the inlet openings of the valve body. Should it be desired to rotate the plug after the handle 15 has been moved to engage one of the edges of either the plates 13 or 22, the handle may be moved transversely of the body portion sliding the long end of the arm to the opposite side of the plug where the plug may again be rotated.

From the foregoing it will be seen that due to the construction as shown and described, proportionate amounts of hot and cold water may be passed through the valve body and discharged through the outlet opening 6 thereof, and should the valve be connected up to admit fluid at 6, the fluid may be proportionately distributed through openings 7 and 8.

What is claimed as new is:—

A valve including a body portion, said body portion having an opening extending transversely therethrough, and having a flange formed with lugs extending laterally therefrom, a plug having openings, positioned in the body portion, a cap having lugs, a coiled spring disposed between the cap and plug for normally urging the plug within the body portion to insure a fluid-tight connection between the body portion and plug, and means for rotating the plug.

In testimony that I claim the foregoing as my own, I have hereto affixed my signature in the presence of two witnesses.

ALFRED W. CHARLES.

Witnesses:
LEO V. MORAN,
LEON B. HELMAN.